US009467842B2

(12) United States Patent
Pianese et al.

(10) Patent No.: US 9,467,842 B2
(45) Date of Patent: Oct. 11, 2016

(54) DISCOVERY OF OBJECTS IN WIRELESS ENVIRONMENTS

(71) Applicant: Alcatel Lucent, Paris (FR)

(72) Inventors: Fabio Pianese, Brussels (BE); Utku G. Acer, Antwerpen (BE)

(73) Assignee: Alcatel Lucent, Boulogne-Billancourt (FR)

(*) Notice: Subject to any disclaimer, the term of this patent is extended or adjusted under 35 U.S.C. 154(b) by 195 days.

(21) Appl. No.: 14/104,037

(22) Filed: Dec. 12, 2013

(65) Prior Publication Data
US 2015/0172900 A1   Jun. 18, 2015

(51) Int. Cl.
H04W 4/00 (2009.01)
H04W 8/00 (2009.01)
H04L 12/24 (2006.01)

(52) U.S. Cl.
CPC .............. *H04W 8/005* (2013.01); *H04L 41/12* (2013.01); *H04W 4/008* (2013.01)

(58) Field of Classification Search
USPC ................................. 370/252, 328, 338, 401
See application file for complete search history.

(56) References Cited

U.S. PATENT DOCUMENTS

| 2004/0253986 | A1* | 12/2004 | Hochwald et al. | 455/562.1 |
| 2005/0021758 | A1* | 1/2005 | White | 709/226 |
| 2006/0120349 | A1* | 6/2006 | Taylor et al. | 370/352 |
| 2007/0002840 | A1* | 1/2007 | Song et al. | 370/352 |
| 2011/0320538 | A1* | 12/2011 | Ickman et al. | 709/206 |
| 2013/0339472 | A1* | 12/2013 | Ruellan et al. | 709/214 |
| 2013/0339526 | A1* | 12/2013 | Ruellan et al. | 709/226 |

FOREIGN PATENT DOCUMENTS

| EP | 2 503 804 | 9/2012 |
| WO | WO 2008/151674 | 12/2008 |
| WO | WO 2011/008889 | 1/2011 |

OTHER PUBLICATIONS

Lu S., et al., "Device Discovery and Connection Establishment Approach Using Ad-Hoc Wi-Fi for Opportunistic Networks," 7th International Workshop on Mobile Peer-to-Peer Computing, 2011, pp. 461-466.

(Continued)

*Primary Examiner* — Ricky Ngo
*Assistant Examiner* — Christine Ng
(74) *Attorney, Agent, or Firm* — Tong, Rea, Bentley & Kim, LLC

(57) ABSTRACT

An object discovery capability is provided to enable discovery of objects in a wireless environment, which may include discovering objects available from a set of wireless nodes in a wireless environment. The discovery of objects available from a set of wireless nodes may include a determination as to whether a particular object is available from the set of wireless nodes, identification of the wireless node or nodes from which a particular object is available, or the like. The object discovery capability may leverage physical features of the wireless medium (namely the additive nature of wireless signals in a Hertzian broadcast channel) in combination with set reconciliation techniques (e.g., using data encoding structures, such as Bloom filters, with information at the physical layer or one or more other layers) in order to enable discovery of objects available from a set of wireless nodes in a wireless environment.

23 Claims, 4 Drawing Sheets

(56) References Cited

OTHER PUBLICATIONS

Katti S., et al., "Embracing Wireless Interference: Analog Network Coding," *Proceedings of the 2007 Conference on Applications, Technologies, Architectures, and Protocols for Computer Communications*, Aug. 2007, pp. 397-408, ACM, New York, NY.

Broder A., et al., "Network Applications of Bloom Filters: A Survey," *Internet Mathematics*, pp. 485-509, vol. 1, No. 4, 2003.

Chandra R., et al., "Beacon-Stuffing:Wi-Fi Without Associations", *8th Workshop on Mobile Computing Systems and Applications, 2007. Hot Mobile 2007*, Mar. 2007, pp. 53-57, Tucson, AZ.

Wirtz H., "On-Demand Content-Centric Wireless Networking," *Proceedings of the 18th Annual International Conference on Mobile Computing and Networking*, pp. 451-453, Aug. 22-26, 2012, Istanbul, Turkey.

Outay et al., "BF-SD-ZRP: A Smart Integrated Scheme for Service and Route Discovery in Mobile Ad Hoc Network," 12th IEEE International conference on High Performance Computing and Communications (HPCC), Sep. 1, 2010, pp. 404-412.

Wewetzer et al., "Content Registration in VANETS—Saving Bandwidth Through Node Cooperation," 3rd IEEE Local Computer Networks (LCN) Workshop on User MObility and VEhicular Networks (ON-MOVE 2009), Oct. 2, 2009, pp. 661-668.

Skjegstad et al., "A Protocol for Robust and Efficient Service Discovery in Large, Highly Mobile Radio Networks," Military Communications Conference 2010 (Milcom 2010), IEEE, Oct. 31, 2010, pp. 456-463.

International Search Report and Written Opinion of PCT/IB2014/002905, dated Mar. 27, 2015, pp. 1-10.

* cited by examiner

DISCOVERY OF OBJECTS IN WIRELESS ENVIRONMENTS

TECHNICAL FIELD

The disclosure relates generally to wireless environments and, more specifically but not exclusively, to discovery of objects within wireless environments.

BACKGROUND

The "Internet of Things" is a vision that predicates a world in which intelligent devices and objects communicate with each other (e.g., discovering their existence, presenting their capabilities, negotiating service contracts, performing useful activities, and so forth) with little or no human assistance or supervision. The opportunistic discovery of devices and their capabilities in wireless network environments is an open subject of research. Various technology standards (e.g. Institute of Electrical and Electronics Engineers (IEEE) 802.11 ad-hoc mode and Radio Frequency Identifier (RFID) tag search, and so forth) support non-coordinated interaction between devices, and various associated techniques for automated object discovery have been developed. For example, one technique for automated object discovery includes use of carefully-crafted Service Set Identifiers (SSIDs) to represent the availability of certain functionalities, thereby allowing a new session-dependent SSID to be agreed upon and then used for further communication. Similarly, for example, another technique for automated object discovery prescribes an iterative search in the device namespace, triggering multiple responses that interfere with one another, until the target device is singled out (e.g. searching for RFID tags). However, the prevalent techniques for automated object discovery are slow, crude, and prone to mutual interference.

SUMMARY OF EMBODIMENTS

Various deficiencies in the prior art are addressed by embodiments for supporting discovery of objects available from a set of wireless nodes, which may include determining objects available from the set of wireless nodes and identifying wireless nodes storing specific objects.

In at least some embodiments, an apparatus includes a processor and a memory communicatively connected to the processor, where the processor is configured to receive a sequence of combined wireless signals and generate a combined object data structure based on the sequence of combined wireless signals. The combined wireless signals are respective wireless combinations of wireless signals of respective wireless signal sequences transmitted contemporaneously by the wireless nodes. The wireless signal sequences of the wireless nodes are representative of respective local object data structures of the wireless nodes. The local object data structures of the wireless nodes are indicative of respective sets of objects available from the wireless nodes. The combined object data structure is indicative of objects available from the set of wireless nodes.

In at least some embodiments, a method includes using a processor and a memory for receiving a sequence of combined wireless signals and generating a combined object data structure based on the sequence of combined wireless signals. The combined wireless signals are respective wireless combinations of wireless signals of respective wireless signal sequences transmitted contemporaneously by the wireless nodes. The wireless signal sequences of the wireless nodes are representative of respective local object data structures of the wireless nodes. The local object data structures of the wireless nodes are indicative of respective sets of objects available from the wireless nodes. The combined object data structure is indicative of objects available from the set of wireless nodes.

In at least some embodiments, a wireless node is configured to wirelessly transmit an object data structure indicative of objects available at the wireless node. The wireless node is associated with a set of wireless nodes that includes the wireless node and at least one other wireless node. The wireless node includes a memory and a processor communicatively connected to the memory. The memory of the wireless node is configured to store the object data structure indicative of objects available at the wireless node, where the object data structure includes a set of values. The processor is configured to represent the object data structure as a sequence of signals by providing, for each value in the set of values, a respective signal representing the value in the set of values, where FALSE value in the set of values is represented using a global signal for FALSE that is used by each of the wireless nodes in the set of wireless nodes to represent FALSE values within respective object data structures of the wireless nodes, and where each TRUE value in the set of values is represented using a local signal for TRUE that is unique within the set of wireless nodes for use only by the wireless node to represent TRUE values of the object data structure. The processor is configured to control transmission of the sequence of signals from the wireless node wirelessly.

In at least some embodiments, a method is provided for use by a wireless node to wirelessly transmit an object data structure indicative of objects available at the wireless node. The wireless node is associated with a set of wireless nodes that includes the wireless node and at least one other wireless node. The method includes using a memory to store the object data structure indicative of objects available at the wireless node, where the object data structure includes a set of values. The method includes representing the object data structure as a sequence of signals by providing, for each value in the set of values, a respective signal representing the value in the set of values, where FALSE value in the set of values is represented using a global signal for FALSE that is used by each of the wireless nodes in the set of wireless nodes to represent FALSE values within respective object data structures of the wireless nodes, and where each TRUE value in the set of values is represented using a local signal for TRUE that is unique within the set of wireless nodes for use only by the wireless node to represent TRUE values of the object data structure. The method includes controlling transmission of the sequence of signals from the wireless node wirelessly.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements common to the figures.

DETAILED DESCRIPTION OF EMBODIMENTS

In general, an object discovery capability is presented herein. The object discovery capability enables discovery of objects in a wireless environment, which may include discovering objects available from a set of wireless nodes in a wireless environment. The discovery of objects available from a set of wireless nodes may include a determination as to whether a particular object is available from the set of wireless nodes, identification of the wireless node or nodes from which a particular object is available, or the like. In at least some embodiments, the object discovery capability enables probing of a set of offering wireless nodes, to identify objects available from the offering wireless nodes, to be performed in a single iteration of wireless message exchange, thereby enabling a listening wireless node to test for the presence of a particular object or objects in a local pool of wireless nodes, identify at least one wireless node in a local pool of wireless nodes from which a particular object is available, passively update its view of objects available from a local pool of wireless nodes (information which, e.g., may be cached by the listening wireless node for future use, thereby reducing the need for subsequent probing of the local pool of wireless nodes), or the like, as well as various combinations thereof. In at least some embodiments, the object discovery capability leverages physical features of the wireless medium (namely, the nature of wireless signals in a Hertzian broadcast channel) in combination with set reconciliation techniques (e.g., using data structures, such as Bloom filters, with information at the physical layer (e.g., signal interference, analog network coding, or the like) and, optionally, one or more other layers (e.g., multiplexing at the Media Access Control (MAC) layer or other suitable layer, where the multiplexing may be in the time domain, frequency domain, code domain, or the like) in order to enable discovery of objects available from a set of wireless nodes in a wireless environment. The discovery of objects available from a set of wireless nodes may be better understood when considered within the context of an exemplary wireless network, such as the exemplary wireless network depicted in FIG. 1.

Figure 1:
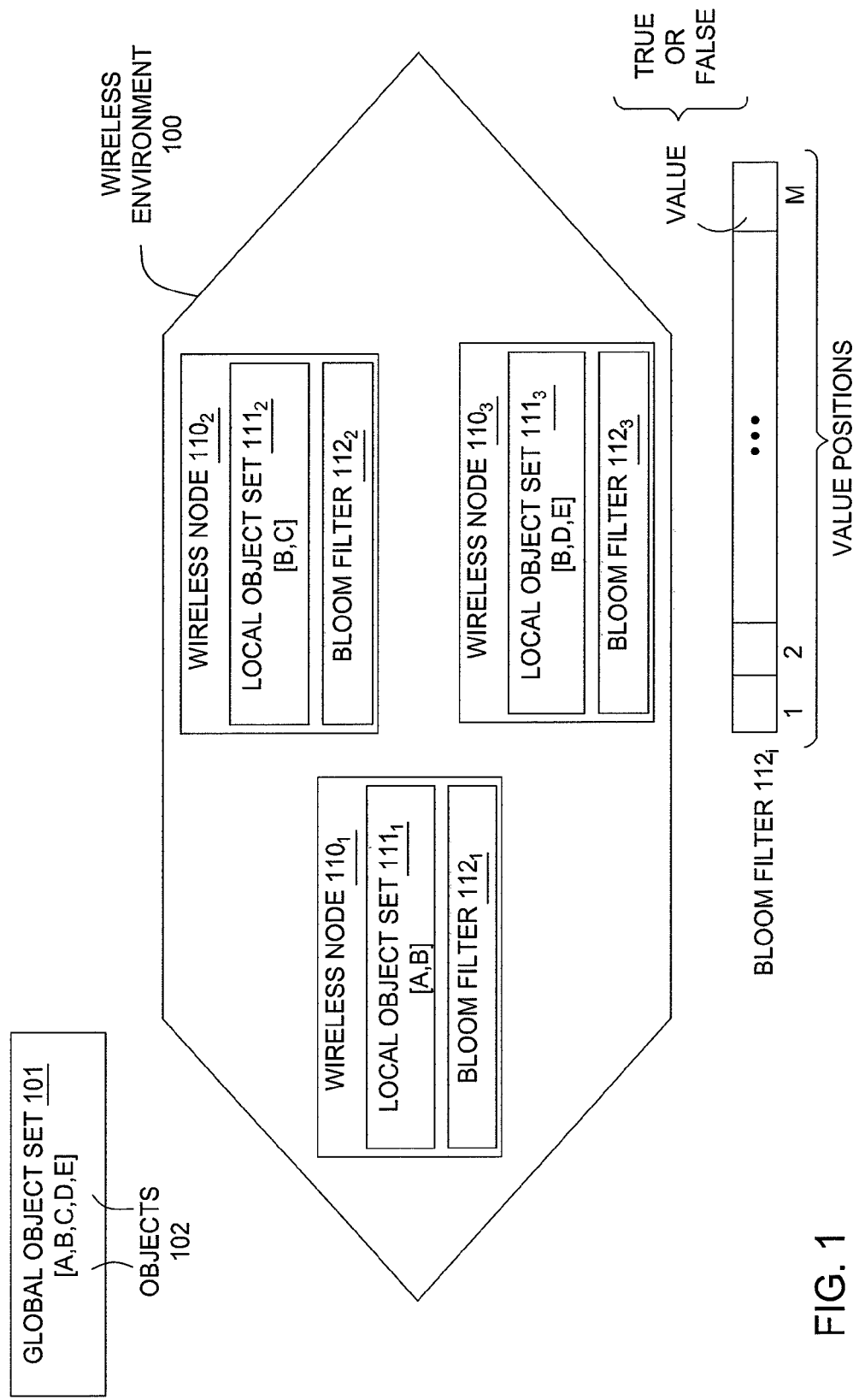
FIG. 1 depicts an exemplary environment including a set of wireless nodes storing objects.

FIG. 1 depicts an exemplary environment including a set of wireless nodes storing objects.

The exemplary environment 100 supports a global object set 101 including objects 102. In general, an object 102 may be any information that may be represented in binary form. For example, objects 102 may be names, node identifiers, files, services, content items (e.g., audio files, videos, or the like), or the like. In the exemplary environment 100, global object set 101 is [A, B, C, D, E]. It will be appreciated that the global object set 101 may include fewer or more than the five objects 102 listed as being part of the global object set 101.

The exemplary environment 100 includes three wireless nodes $110_1$-$110_3$ (collectively, wireless nodes 110). It will be appreciated that fewer or more wireless nodes 110 may be present in exemplary environment 100. The exemplary environment 100 may include any suitable type of environment in which wireless nodes 110 may be located. The wireless nodes 110 may include any wireless-enabled devices. The wireless nodes 110 may be independent or may be associated in some manner (e.g., as part of a common wireless network). For example, wireless nodes 110 may include Radio Frequency Identifier (RFID) tags, sensors, autonomous wireless devices (e.g., for machine-to-machine (M2M) type communications), wireless user terminals (WUTs), Wireless Fidelity (WiFi) access points (WAPs), fixed cellular base stations (BSs), mobile cellular BSs, or the like.

The wireless nodes $110_1$-$110_3$ store local object sets $111_1$-$111_3$ (collectively, local object sets 111), respectively. The local object set 111 of a wireless node 110 may be stored on the wireless node 110 in any suitable manner (e.g., in permanent storage, in memory, in a database, or the like). The local object set 111 of a wireless node 110 may include one or more objects 102 from global object set 101. In the exemplary environment 100, local object set $111_1$ of wireless node $110_1$ is [B, C], local object set $111_2$ of wireless node $110_2$ is [A, B], and local object set $111_3$ of wireless node $110_3$ is [B, D, E]. Thus, it will be appreciated that each wireless node 110 may store some or all of the objects 102 from the global object set 101 and, similarly, that the global object set 101 is the full set of objects 102 available from the wireless nodes 110.

Figure 2:
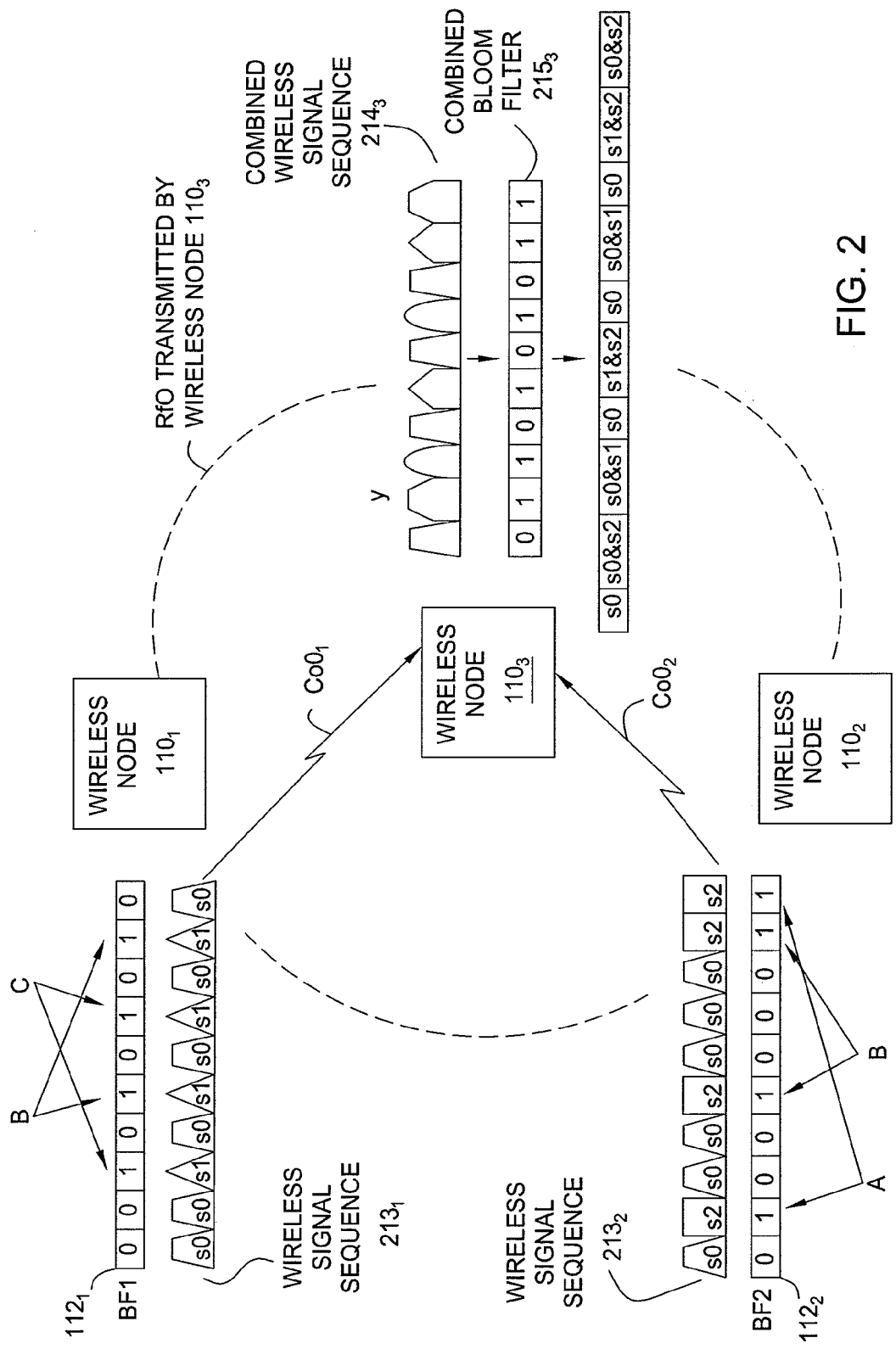
FIG. 2 depicts an exemplary wireless environment and illustrates propagation and processing of wireless signals by wireless nodes in a set of wireless nodes storing objects.

The wireless nodes 110 are configured to represent their respective local object sets 111 using data structures. The wireless nodes 110 may be configured to represent information indicative of their local object sets 111 using data structures. It will be appreciated that there are various mechanisms which may be used to represent membership information of a subset S (e.g., local object set 111) from a full set O (e.g. global object set 101) in a space-efficient way. One such mechanism which may be used to represent membership information of a subset S from a full set O in a space-efficient way is a Bloom filter. Thus, in at least some embodiments, as depicted and described herein, wireless nodes $110_1$-$110_3$ may be configured to represent information indicative of their respective local object sets $111_1$-$111_3$ using Bloom filters $112_1$-$112_3$ (collectively, Bloom filters 112), respectively. In general, a Bloom filter B is a sequence of M values (initially all set to FALSE (e.g., '0')) where an item I can be inserted into Bloom filter B by setting to TRUE (e.g., '1') those value positions of Bloom filter B that correspond to the result of k hash functions H(I) defined on the support [0, m−1] and, further, where a test as to whether an item J is present in Bloom filter B is performed by calculating the k hash functions H(J) and checking the values of the relevant value positions in Bloom filter B (i.e., if all of the relevant value positions for item J are set to TRUE, then the item J is believed to belong to the Bloom filter B with high probability). An exemplary Bloom filter $112_i$ for a wireless node $110_i$ is depicted in FIG. 1. As illustrated in FIG. 1, the Bloom filter 112 is a sequence of M logical values organized in a sequence of M value positions, where each value of each value position may be set to TRUE or FALSE. The specific Bloom filters $112_1$-$112_3$ of wireless nodes $110_1$-$110_3$, respectively, also are depicted in FIG. 1 (and further details are depicted in FIG. 2). It will be appreciated that Bloom filters ensure that no 'false negative' errors are returned (i.e., items in the Bloom filter believed not to be present), and enable the likelihood of 'false positive' errors (i.e., items not contained in the Bloom filter but marked as being present in the Bloom filter) to be tuned by choosing the Bloom filter parameters (namely, m and k) to be in a certain relationship with the expected number of items n to be represented. It will be appreciated that, although primarily depicted and described with respect to embodiments in which wireless nodes 110 use Bloom filters 112 as the data structures used to represent information indicative of their local object sets 111, any other suitable types of data structures may be used by wireless nodes 110 to represent information indicative of their local object sets 111.

The wireless nodes 110 are configured such that a given wireless node 110 is able to determine, in a single message exchange, which objects in the global object set 101 are available from other wireless nodes 110 within wireless range of the given wireless node 110. In this manner, the given wireless node 110 is able to determine, in a single exchange of messages, whether a given object the global object set 101 is available in a local object set 111 of at least one of the other wireless nodes 110 within wireless range of the given wireless node 110.

The wireless nodes $110_1$-$110_3$ are configured to wirelessly transmit their Bloom filters $112_1$-$112_3$, respectively. In general, wireless transmission allows representing a sequence of values (e.g., such as the values of a Bloom filter or other suitable data structure) as a sequence of signals (which may be encoded in any suitable domain, such as time, frequency, code, or the like). Accordingly, a wireless node $110_i$ may be configured to wirelessly transmit its Bloom filter $112_i$ by processing the sequence of values of the value positions of the Bloom filter $112_i$ to produce a sequence of signals representing the values of the value positions of the Bloom filter $112_i$ and wirelessly transmitting the sequence of signals representing the values of the value positions of the Bloom filter $112_i$. In other words, since a Bloom filter $112_i$ is a sequence of values, transmission of a Bloom filter $112_i$ by a wireless node $110_i$ produces a sequence of signals corresponding to the sequence of values of the Bloom filter $112_i$. The signals used to represent values from value positions of a Bloom filter 112 may be any suitable types of signals (e.g., complex symbols, modulated bit sequences, or the like). The signals used to represent values from value positions of a Bloom filter 112 may be encoded in any suitable domain (e.g., time, frequency, code, or the like). It is noted that, since the signals used to represent values from value positions of a Bloom filter 112 may be encoded in any suitable domain (including domains other than the time domain), the terms "sequence of values" and "sequence of signals" (and other related terms) should not necessarily be limited to a sequence that is function of time, but, rather, may only be indicative of a logical ordering among the values and, thus, a logical ordering among the signals representing those values.

The wireless nodes $110_1$-$110_3$ are configured to represent respective Bloom filters $112_1$-$112_3$ by processing the values of the value positions of the Bloom filters $112_1$-$112_3$ to produce signals representing the values of the value positions of the Bloom filters $112_1$-$112_3$, respectively. As noted above, each Bloom filter 112 is a sequence of values and, thus, each wireless node 110 transmits a wireless signal sequence which is a sequence of wireless signals. Let $BF_i[n]$ denote the $n^{th}$ value position of Bloom filter $112_i$ of wireless node $110_i$. The wireless node $110_i$ processes each value position of Bloom filter $112_i$ to produce an associated signal based on the value at the value position of the Bloom filter $112_i$. If $BF_i[n]$=FALSE (e.g., $0$), wireless node $110_i$ produces a global signal $s_0$ which represents that the value at value position n of Bloom filter $112_i$ is not set. The global signal $s_0$ is known by every wireless node 110 in advance (i.e., each wireless node $110_i$ is configured to transmit global signal $s_0$ to represent each FALSE value in its respective Bloom filter $112_i$). If $BF_i[n]$=TRUE (e.g., 1), wireless node $110_i$ produces a local signal $s_i$ which is unique to wireless node $110_i$ and which represents that the value at value position n of Bloom filter $112_i$ is set. The local signal $s_i$ that is used by wireless node $110_i$ may be determined by or on behalf of wireless node $110_i$. The local signal $s_i$ that is used by wireless node $110_i$ may be a function of any suitable information, which may depend on the type of wireless nodes 110 being used (e.g., 802.11 MAC IDs where the wireless nodes 110 communicate using 802.11, RFID tags where the wireless nodes 110 are RFID tags, or the like).

It is noted that the signals used for representing values of Bloom filters 112 of wireless nodes 110 satisfy a "functional orthogonality" property. Let f denote a function that has the following property: $f(s_i, s_j)=0$ if $i \neq j$. The function $f(s_i, s_j)$ takes a positive value only if $i=j$. It will be appreciated that a wireless node $110_i$ only knows global signal $s_0$ and its own local signal $s_i$ for values of its Bloom filter $112_i$ that are set to TRUE, until the wireless node $110_i$ operates as a receiving wireless node and receives a combined wireless signal which is a combined representation of a set of Bloom filters 112 from a set of wireless nodes 110 operating as transmitting wireless nodes. In other words, operating as a receiving wireless node enables a given wireless node $110_i$ to learn the local signal(s) of the other wireless node(s) that are operating as transmitting wireless nodes.

It is noted that the local signal $s_i$ for a wireless node $110_i$ acts as a signature for that wireless node $110_i$. The functional orthogonality property makes it possible to mathematically distinguish two local signals $s_i$ and $s_j$ of two different wireless nodes $110_i$ and $110_j$, respectively. The functional orthogonality property may be realized through an appropriate modulation scheme. As noted above, the signal that is used to represent a value position of a Bloom filter 112 may be a complex symbol, a modulated bit sequence, or the like.

In at least some embodiments, for example, the wireless nodes $110_i$ are configured to transmit local signals $s_i$ that are modulated in amplitude and phase. It is noted that such a signal is typically represented by a complex symbol. In such embodiments, the orthogonality function is defined as $f(s_i, s_j)=s_i * s_j$, where '*' represents the complex conjugate.

In at least some embodiments, for example, the wireless nodes $110_i$ are configured to transmit local signals $s_i$ as modulated bit sequences (e.g., where each value in a Bloom filter $112_i$ is encoded as a bit sequence). If $BF_i[n]$=FALSE, the wireless node $110_i$ transmits a bit sequence $s_0$. If $BF_i[n]$=TRUE, the wireless node $110_i$ transmits a bit sequence $s_i$ (unique to wireless node $110_i$). In such embodiments, the orthogonality function is defined as $f(s_i, s_j)=s_i \times s_j$, where the 'x' operator stands for external product. It is noted that converting a value in a Bloom Filter 112 into a bit sequence may be performed in any suitable manner. In at least some embodiments, for example, wireless node $110_1$ may convert a value in Bloom Filter $112_i$ into a bit sequence using Direct-Sequence Spread Spectrum (DSSS) as it is used in Code Division Multiple Access (CDMA) and wireless transmit the bit sequence using any suitable mechanism for transmission of such a bit sequence (e.g., mapping the bit sequence onto an amplitude-phase slot using Quadrature Amplitude Modulation (QAM), mapping the bit sequence onto a time-frequency slot over the wireless medium through Orthogonal Frequency-Division Multiplexing (OFDM), or the like). In at least some embodiments, for example, wireless node $110_i$ may convert a value in Bloom Filter $112_i$ into a bit sequence and wireless transmit the bit sequence using analog network coding techniques, such as those described in the paper entitled "Embracing Wireless Interference: Analog Network Coding," by Katti et al. Various other implementations are contemplated.

The wireless nodes 110 may be configured to wirelessly transmit their Bloom filters 112 in a synchronized fashion. It will be appreciated that, due to the nature of the wireless transmission medium, two or more transmitting wireless devices transmitting at (or roughly at) the same time within the same domain representation (e.g., again, frequency, code, or the like) will collide such that a receiving wireless device will not be able to differentiate the contents of the wireless communication, and—in the general case—will not be able to decode the contents of the wireless communication. However, if the information conveyed in the physical domain is structured by the transmitting wireless devices using suitable data structures (e.g., Bloom filters or other suitable data structures), the wireless channel will implicitly apply a logical OR to the transmitted data, which provides a desired summation of the multiple data structures in the received data that is received by receiving wireless device. Accordingly, as noted above, wireless nodes 110 may be configured to wirelessly transmit their Bloom filters 112 in a synchronized fashion, where synchronization indicates that a set of transmitting wireless nodes 110 transmits their respective Bloom filters 112 such that a receiving wireless node 110 that is "listening" to the wireless transmission medium receives wireless transmissions from the other wireless nodes 110 in a manner enabling the wireless properties of the wireless transmission medium to produce at the receiving wireless node 110 a combined wireless signal sequence that represents the wireless transmissions by the other wireless nodes 110 of their respective Bloom filters 112 using respective signal sequences. The synchronization of wireless transmissions such that a set of transmitting wireless nodes 110 transmits their respective Bloom filters 112 at or near the same time may be provided by one or more of a pre-determined schedule configured on the wireless nodes 110, configuration of the wireless nodes 110 to perform periodic wireless transmissions, interrogation of the wireless nodes 110 by an interrogating device (e.g., one of the wireless nodes 110 that is listening to the wireless transmission medium, a control device that is not one of the wireless nodes 110 (e.g., a management system), or the like), or the like, as well as various combinations thereof. In other words, a wireless node 110 may be configured to transmit its Bloom filter 112 in response to a trigger condition (e.g., detection of a time at which the wireless node 110 is scheduled to transmit its Bloom filter 112, receipt of a message requesting that the wireless node 110 transmit its Bloom filter 112, or the like).

As a result, a given wireless node 110, by detecting the mere presence of valid communication on a wireless channel (as opposed to noise from sources not involved in the object identification process), is able to determine, in a single message exchange, a Bloom filter representation of the objects available from other wireless nodes 110 transmitting within wireless range of the given wireless node 110 and, thus, is able to determine which objects in the global object set 101 are available from other wireless nodes 110 transmitting within wireless range of the given wireless node 110. The operation of given wireless node 110 in determining which objects in the global object set 101 are available from other wireless nodes 110 transmitting within wireless range of the given wireless node 110 is described below.

The wireless nodes 110 are configured such that a given wireless node 110 is able to determine, in a single message exchange, which objects in the global object set 101 are available from other wireless nodes 110 within wireless range of the given wireless node 110. The given wireless node 110 that determines which objects in the global object set 101 are available from other wireless nodes 110 within wireless range of the given wireless node 110 is referred to as the receiving wireless node 110 and the other wireless nodes 110 are referred to as transmitting wireless nodes 110. Let $x_i[n]$ denote the $n^{th}$ signal transmitted by transmitting wireless node $110_i$, which corresponds to $BF_i[n]$ for Bloom filter $112_i$ of transmitting wireless node $110_i$. As described above, transmission of Bloom filters 112 by transmitting wireless nodes 110 is aligned such that the $n^{th}$ signals from each of the transmitting wireless nodes 110 are all received by the receiving wireless node 110 at the same time (or at least sufficiently close in time to allow the wireless properties of the wireless transmission medium to produce a combined wireless signal sequence that may be used by the receiving wireless node 110 to determine which objects 102 in the global object set 101 are available from the transmitting wireless nodes 110). The n-th combined wireless signal of the combined wireless signal sequence (denoted as y[n] of combined wireless signal sequence Y) received at the receiving wireless node 110 due to transmissions of Bloom filters 112 by the transmitting wireless nodes 110 may be given by:

$$y[n] = \sum_{i=1}^{N} H_i x_i[n] + w[n],$$

where (1) $x_i[n]$, as indicated above, denotes the $n^{th}$ signal transmitted by transmitting wireless node $110_i$, which corresponds to $BF_i[n]$ for Bloom filter $112_i$ of transmitting wireless node $110_i$, (2) each $H_i$ is a complex number that characterizes the wireless channel between the $i^{th}$ transmitting wireless node 110 and the receiving wireless node 110 (e.g., characterization in terms of attenuation and phase shift that depends on the distance between the transmitting wireless node and the receiving wireless nodes), (3) w[n] is an instance of random complex noise, and (4) N is the number of transmitting wireless nodes 110 that transmitted their respective Bloom filters 112. It is noted that this description assumes a flat-fading quasi-static channel, and may be suitably adapted for other types of wireless channels. It is further noted that operation with a relatively large SNR is assumed such that the noise term may be neglected from the combined wireless signal sequence received at the receiving wireless node 110 (but that various embodiments may account for the noise term in the expression of the combined wireless signal sequence received at the receiving wireless node 110). The combined wireless signal sequence received at the receiving wireless node 110 is a superposition of a set of signals transmitted by the transmitting wireless nodes 110, which may be processed to set values of value positions of a combined Bloom filter, respectively. It will be appreciated that, since the signals of the combined wireless signal sequence correspond to value positions of the Bloom filters 112 transmitted by the transmitting wireless nodes 110, synchronized transmission of the Bloom filters 112 by the transmitting wireless nodes 110 enables the wireless properties of the wireless transmission medium to produce logical ORs of the value positions of the Bloom filters 112 transmitted by the transmitting wireless nodes 110 (i.e., the value positions of the combined Bloom filter determined at the receiving wireless node 110 are logical ORs of the value positions of the Bloom filters 112 transmitted by the transmitting wireless nodes 110, respectively). In other words, the combined wireless signal sequence includes a number of signals corresponding to the number of value positions of each of the Bloom filters 112 transmitted by the transmitting wireless nodes 110 and, similarly, the combined Bloom filter includes the same number of value positions as the Bloom filters 112 transmitted by the transmitting wireless nodes 110.

The receiving wireless node 110 processes the combined wireless signal sequence in order to determine the combined Bloom filter, which may then be used in order to determine which objects 102 in the global object set 101 are available from the transmitting wireless nodes 110. The processing of the combined wireless signal sequence in order to determine the combined Bloom filter may depend on the type of signals used by the transmitting wireless nodes 110 to represent their respective Bloom filters 112 (e.g., complex symbols, modulated bit sequences, or the like).

In at least some embodiments, for example, in which each signal of the transmitting wireless nodes is represented by a complex symbol that yields the amplitude and the phase of the signal, the receiving wireless node 110 may process the combined wireless signal sequence in order to determine the combined Bloom filter by calculating the projection of the combined wireless signal sequence on global signal $s_0$ (i.e., the global signal for a FALSE value that is recognized by each wireless node 110 as being representative of a FALSE value). The receiving wireless node 110 calculates the projection of the combined wireless signal sequence on global signal $s_0$. Namely, for a given combined wireless signal y[n] of the combined wireless signal sequence received by the receiving wireless node 110, the receiving wireless node 110 determines if $s_0^*y[n]=|s_0||y[n]|$, where y[n] is the combined wireless signal at the n-th position of the combined wireless signal sequence and $s_0^*$ refers to the complex conjugate of global signal $s_0$. If $s_0^*y[n]=|s_0||y[n]|$, then a determination is made that the given combined wireless signal y[n] totally projects on global signal $s_0$ and, thus, that the combined wireless signal y[n] is a wireless combination of global signals $s_0$ (i.e., based on logical OR properties of the signals of the combined wireless signal sequence, a determination is made that no other signal, other than global signal $s_0$, has been transmitted by any of the transmitting wireless nodes 110) and, thus, that the value of the corresponding value position of the combined Bloom filter is set to FALSE (e.g., "0"). Alternatively, if $s_0^*y[n] \neq |s_0||y[n]|$, then a determination is made that combined wireless signal y[n] includes at least one local signal si that is orthogonal to global signal $s_0$ so that there is at least one transmitting wireless node 110 that transmitted a TRUE value (i.e., based on logical OR properties of the signals of the combined wireless signal sequence), a determination is made that there is at least one transmitting node 110 with BF[n]=TRUE at that corresponding value position of its Bloom filter 112) and, thus, the value of the corresponding value position of the combined Bloom filter is set to TRUE (e.g., "1"). In this manner, the receiving wireless node 110 logically ORs the Bloom filters 112 of the transmitting wireless nodes 110 (on a value position by value position basis) to produce a combined Bloom filter which may be used by the receiving wireless node 110 to determine which objects 102 in the global object set 101 are available from the transmitting wireless nodes 110. The receiving wireless node 110 may then use the combined Bloom filter to check for availability of particular objects 102 from the set of transmitting wireless nodes 110 in a manner which would be understood by one skilled in the art (e.g., hashing into the combined Bloom filter).

The wireless nodes 110 are configured such that a given receiving wireless node 110 is able to identify, in a single message exchange, one of the transmitting wireless nodes 110 that includes a particular object 102. In this manner, the given receiving wireless node 110 is able to identify, in a single exchange of messages, a source of a given object 102 of the global object set 101 from among a set of transmitting wireless nodes 110 within wireless range of the given receiving wireless node 110.

In at least some embodiments, in which an assumption may be made that no collisions occur in the transmission of values of the Bloom filters 112 that are set to TRUE, the identity of a transmitting wireless node 110 may be represented within the signal that represents the TRUE value of the Bloom filter 112 of the transmitting wireless node 110 (e.g., within local signal $s_i$ of transmitting wireless node $110_i$). The inclusion of the identity of a transmitting wireless node 110 in this manner enables a receiving wireless node 110 to identify the transmitting wireless node 110 as the source of an object 102 by decoding the wireless signal associated with the wireless transmitting node 110 when the wireless signal of transmitting wireless node 110 is detected for the object in the combined Bloom filter of the receiving wireless node 110. In at least some such embodiments, a receiving wireless node 110, after determining the combined Bloom filter resulting from wireless transmissions by a set of transmitting wireless nodes 110, may identify one of the transmitting wireless nodes 110 that includes a particular object 102 by analyzing the set of value positions of the combined Bloom filter corresponding to the particular object 102 in order to determine whether the particular object 102 is available from at least one of the transmitting wireless nodes 110 and, in response to a determination that the particular object 102 is available from at least one of the transmitting wireless nodes 110, decoding any one of the signals of any one of the value positions of the combined Bloom filter corresponding to the particular object 102 in order to reveal the identity of an associated one of the transmitting wireless nodes 110 from which the particular object 102 is available.

In at least some embodiments, in which an assumption is not made that no collisions occur in the transmission of values of the Bloom filters 112 that are set to TRUE, a receiving wireless node 110 may identify a transmitting wireless node 110 from which an object is available based on one or more analog network coding techniques. It is noted that, in the general case, collisions between transmitting wireless nodes 110 will happen in the following two cases: (1) when two or more transmitting wireless nodes 110 include a common subset of objects and (2) when transmitting wireless nodes 110 include disjoint sets of objects but their associated Bloom filters 112 have corresponding value positions set to TRUE. In at least some embodiments, as noted above, these cases may be handled by enabling a receiving wireless node 110 to use analog network coding techniques which allow reconstruction of linear combinations of wireless signals from prior partial knowledge of what has likely been transmitted. It is assumed that the Bloom filters 112 of wireless nodes 110 are large enough that there is a sufficiently large number of indexes such that there is only one transmitting wireless node 110 for which $BF_i[n]=1$. It is noted that each value may be factorized using a method similar to the Gram-Schmidt process or using any other suitable process.

In at least some embodiments, a receiving wireless node 110 is able to identify one of the transmitting wireless nodes 110 that includes a given object 102 by identifying a value position n of the combined Bloom filter that corresponds to the given object 102 (e.g., having a value set to TRUE only for the given object 102) and processing the combined wireless signal y[n] associated with the value position n in order to determine which of the local signals of the transmitting wireless nodes 110 contributed to combined wireless signal y[n].

In at least some embodiments, the receiving wireless node 110 is configured to determine which of the local signals of the transmitting wireless nodes 110 contributed to combined wireless signal y[n] by projecting the combined wireless signal y[n] onto each signal s in a set of signals S, where the set of signals S includes global signal $s_0$ as well as each of the local signals within the combined wireless signal sequence (and, thus, which could be contributing to the combined wireless signal y[n]).

In at least some embodiments, the receiving wireless node 110 is configured to determine which of the local signals of the transmitting wireless nodes 110 contributed to combined wireless signal y[n] based on the set of signals S by, for each signal s in the set of signals S, iteratively performing: (1) calculate a temporary signal r[n,s] by projecting the combined wireless signal y[n] on the signal s from the set of signals S, and (2) determine whether the signal s contributed to combined wireless signal y[n] by measuring the energy value of the temporary signal r[n,s] and comparing the energy value of the temporary signal r[n,s] against a threshold (e.g., a determination is made that signal s contributed to combined wireless signal y[n] based on a determination that the energy value of the temporary signal r[n,s] satisfies the threshold and a determination is made that signal s did not contribute to combined wireless signal y[n] based on a determination that the energy value of the temporary signal r[n,s] does not satisfy the threshold).

In at least some embodiments, the receiving wireless node 110 is configured to determine the set of signals S by (1) initializing the set of signals S to include the global signal for FALSE ($s_0$), (2) initializing a sequence of temporary signals (denoted as r) that is equal to the combined wireless signal sequence y received by the receiving wireless node (i.e., r[n] is equal to y[n] at each of the positions of the combined wireless signal sequence), (3) iterate as follows until the value of each temporary signal r[n] is below a threshold: (3a) iteratively perform the following on each of the combined wireless signals of the combined wireless signal sequence: (3a-i) compute the value of the temporary signal r[n] by subtracting the projections of the combined wireless signal y[n] on the set of signals S, (3a-ii) determine, from among the temporary signals r[n], a wireless signal q having the lowest energy value that is greater than a threshold, and (3a-iii) add the determined signal q to the set of signals S.

In at least some embodiments, the receiving wireless node 110 may determine which of the local signals of the transmitting wireless nodes 110 contributed to each of the combined wireless signals y[n] in the combined wireless signal sequence. In at least some such embodiments, given the association between the combined wireless signals y[n] of the combined wireless signal sequence and the value positions of the combined Bloom filter, the receiving wireless node 110 is able to maintain, for each of the value positions of the combined Bloom filter, information indicative of which of the local signals contributed to the combined wireless signal which was processed to determine the value in that value position of the combined Bloom filter.

It is noted that the foregoing description of the process by which a receiving wireless node 110 identifies one of the transmitting wireless nodes 110 that includes a given object 102 is specific to embodiments in which the signals used by the transmitting nodes 110 are complex symbols. As described herein, however, the transmitting wireless nodes 110 may represent the values of the Bloom filters 112 using signals other than complex symbols. Accordingly, more generally, the receiving wireless node 110 may be configured to identify one of the transmitting wireless nodes 110 that includes a given object 102 by using projections on the functionally orthogonal signals used by the transmitting nodes 110 to represent the values of the Bloom filters 112. This more general embodiment is applicable for use with any of the various signal types that may be used by the transmitting nodes 110 to represent the values of the Bloom filters 112.

In at least some embodiments, additional information determined regarding which transmitting wireless nodes 110 reported TRUE values in the combined Bloom filter of a receiving wireless node 110 may be used to suppress false positives, thereby allowing reductions in the size of the Bloom filters 112 used by the wireless nodes 110.

Various embodiments discussed within the context of FIG. 1 may be better understood with respect to the example of FIG. 2.

FIG. 2 depicts an exemplary wireless environment and illustrates propagation and processing of wireless signals by wireless nodes in a set of wireless nodes storing objects. The wireless environment 200 of FIG. 2 is similar to wireless environment 100 of FIG. 1, including wireless nodes 110 depicted and described with respect to FIG. 1. In this example, assume that wireless node $110_3$ wants to determine which objects 102 are available in its vicinity (which includes wireless nodes $110_1$ and $110_2$). For purposes of clarity, this example assumes that no two Bloom filters 112 are identical (i.e. they all differ for at least a single value position set to TRUE), although it will be appreciated that embodiments still may be supported in the case of Bloom filters 112 which do not support this property. The wireless node $110_3$, upon sensing that no other transmissions are ongoing in its vicinity, transmits a Request for Objects (RfO) message. The other wireless nodes 110 in the vicinity of wireless node $110_3$ (again, wireless nodes $110_1$ and $110_2$), upon receiving the RfO message, respond to the RfO message with respective Content of Objects (CoO) messages including Bloom filters $112_1$ and $112_2$ which are wireless signal sequences representative of local object sets $111_1$ and $111_2$, respectively. The wireless nodes $110_1$ and $110_2$, upon receiving the RfO message, transform the Bloom filters $112_1$ and $112_2$ into the CoO messages by converting each of the value positions of the Bloom filters $112_1$ and $112_2$ into respective signals. Namely, the wireless node $110_i$ is configured to (1) if $BF_i[n]$=FALSE (e.g., "0"), produce the global signal $s_0$ (the signal for FALSE, as discussed above) and (2) if $BF_i[n]$=TRUE (e.g., "1"), produce the local signal $s_i$ which is unique to node $110_i$. As depicted in FIG. 2, the Bloom filter $112_1$ of wireless node $110_1$ includes ten value positions having values set as [0, 0, 1, 0, 1, 0, 1, 0, 1, 0] (where value positions 5 and 9 being set to TRUE indicates the presence of object B on wireless node $110_1$, and value positions 3 and 7 being set to TRUE indicates the presence of object C on wireless node $110_1$) and, thus, wireless node $110_1$ transmits a wireless signal sequence $213_1$ including the following signals $[s_0, s_0, s_1, s_0, S_1, s_0, S_1, s_0, S_1, s_0]$. Similarly, as depicted in FIG. 2, the Bloom filter $112_2$ of wireless node $110_2$ includes ten value positions having values set as [0, 1, 0, 0, 1, 0, 0, 0, 1, 1] (where value positions 2 and 10 being set to TRUE indicates the presence of object A on wireless node $110_2$, and value positions 5 and 9 being set to TRUE indicates the presence of object B on wireless node $110_2$) and, thus, wireless node $110_2$ transmits a wireless signal sequence $213_2$ including the following signals [$s_0$, $s_2$, $s_0$, $s_0$, $s_2$, $s_0$, $s_0$, $s_0$, $s_2$, $s_2$]. Thus, the wireless nodes $110_1$ and $110_2$ transmit the CoO messages including the Bloom filters $112_1$ and $112_2$ as wireless signal sequences $213_1$ and $213_2$, respectively, and wireless properties of the wireless signal medium result in a merging of the CoO messages such that the wireless node $110_3$ receives a combined CoO message from which wireless node $110_3$ can (1) determine the set of objects available from wireless nodes $110_1$ and $110_2$ within its vicinity and (2) for a given object, identify at least one of the wireless nodes $110_1$ and $110_2$ within its vicinity from which the given object is available. As depicted in FIG. 2, wireless node $110_3$ receives combined wireless signal sequence $214_3$ including ten signals, where each of the signals of the combined wireless signal sequence $214_3$ includes a wireless combination of the two signals transmitted by wireless nodes $110_1$ and $110_2$ in the corresponding positions of their wireless signal sequences $213_1$ and $213_2$, respectively. The wireless node $110_3$ processes the combined wireless signal sequence $214_3$ to produce a combined Bloom filter $215_3$ which represents logical ORs of the values portions of the Bloom filters $112_1$ and $112_2$ transmitted by wireless nodes $110_1$ and $110_2$, respectively. As depicted in FIG. 2, the combined wireless signal in the first position of the combined wireless signal sequence $214_3$ is determined to be global signal $s_0$ such that the first value position of combined Bloom filter $215_3$ is set to FALSE (e.g., "0"), the combined wireless signal in the second position of the combined wireless signal sequence $214_3$ is determined to be something other than global signal $s_0$ (namely, a combination of global signal $s_0$ transmitted by wireless node $110_1$ in the second position of its wireless signal sequence $213_1$ and local signal $s_2$ transmitted by wireless node $110_2$ in the second position of its wireless signal sequence $213_2$) such that the second value position of combined Bloom filter $215_3$ is set to TRUE (e.g., "1"), and so forth, until the wireless node $110_3$ has constructed the combined Bloom filter $215_3$ from combined wireless signal sequence $214_3$. The wireless node $110_3$ may then use the combined Bloom filter $215_3$ to determine the set of objects available from wireless nodes $110_1$ and $110_2$ within its vicinity (e.g., by determining that value positions 2 and 10 corresponding to object A are set to TRUE in the combined Bloom filter $215_3$, wireless node $110_3$ knows that object A is available from at least one of wireless node $110_1$ and wireless node $110_2$; similarly, by determining that value positions 5 and 9 corresponding to object B are set to TRUE in the combined Bloom filter $215_3$, wireless node $110_3$ knows that object B is available from at least one of wireless node $110_1$ and wireless node $110_2$). The wireless node $110_3$ also may use the combined Bloom filter $215_3$ to identify, for a given object, at least one of the wireless nodes $110_1$ and $110_2$ within its vicinity from which the given object is available.

Figure 3:
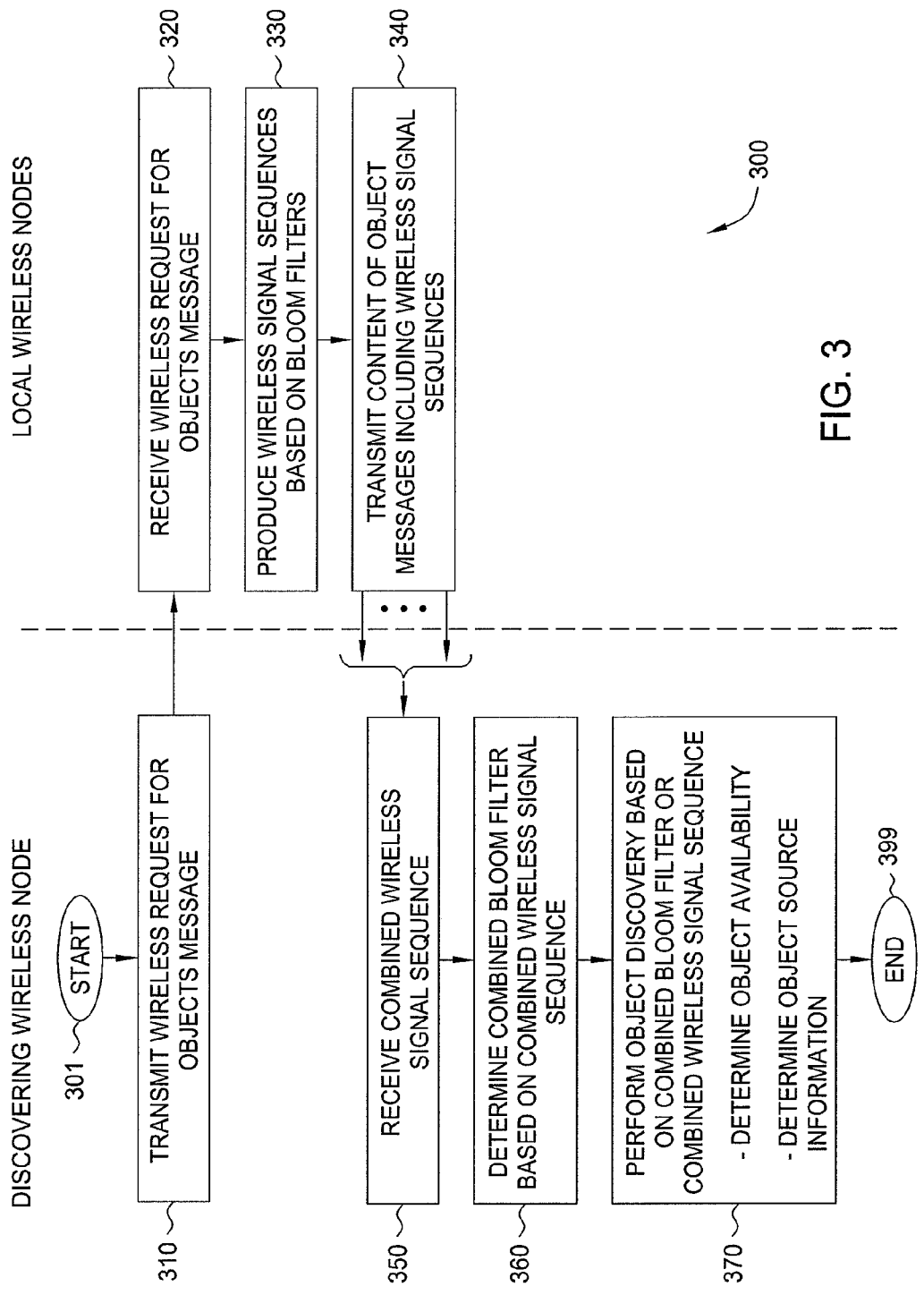
FIG. 3 depicts an embodiment of a method for discovering a set of objects available from a set of wireless nodes.

FIG. 3 depicts an embodiment of a method for discovering a set of objects available from a set of wireless nodes. As depicted in FIG. 3, in method 300, a portion of the steps are performed by a discovering wireless node (primarily referred to herein as a receiving wireless node) and a portion of the steps are performed by a set of local wireless nodes (primarily referred to herein as a transmitting wireless nodes) within wireless range of the discovering wireless node. At step 301, method 300 begins. At step 310, the discovering wireless node transmits a wireless Request for Objects (RfO) message. The wireless RfO message will be received by other wireless nodes within wireless range of the discovering wireless node (in this case, the local wireless nodes). At step 320, each of the local wireless nodes receives the wireless RfO message. At step 330, each of the local wireless nodes produces a respective wireless signal sequence based on its Bloom filter, respectively. Namely, each local wireless node represents each value of its Bloom filter using a respective signal (e.g., using the global signal for FALSE and respective local signals for TRUE) to form thereby the wireless signal sequences of the local wireless nodes. At step 340, each of the local wireless nodes transmits a respective Content of Object (CoO) message including its respective wireless signal sequence produced based on its respective Bloom filter. It is noted that each of the local wireless nodes also may be considered to transmit its respective wireless signal sequence produced based on its respective Bloom filter independent of any particular type of message. At step 350, the discovering wireless node receives a combined wireless signal sequence which, as depicted in FIG. 3, results from wireless properties of the wireless transmission medium within which the local wireless nodes transmit their wireless signal sequences. At step 360, the discovering wireless node determines a combined Bloom filter from the combined wireless signal sequence. At step 370, the discovering wireless node performs object discovery on the set of local wireless nodes based on the combined Bloom filter or the combined wireless signal sequence (e.g., determining object availability for one or more objects based on the combined Bloom filter, determining object source information for one or more objects based on the combined wireless signal sequence, or the like, as well as various combinations thereof). At step 399, method 300 ends. It will be appreciated that the various steps of method 300 may be better understood by way of reference to FIGS. 1 and 2.

As described herein, various embodiments depicted and described herein may be used in various types of environments or for various types of applications. For example, embodiments depicted and described herein may be used to perform RFID scanning of a large number (N) of devices in order to find a particular device in O(1), rather than by iterating queries over O(log N) groups of devices in order to find the particular device. Similarly, for example, embodiments depicted and described herein may be used to build a summary Bloom filter, representing a list of all of the objects that are present in the devices within the wireless range, in O(1), rather than by iterating over the devices in O(N).

Various embodiments of the object discovery capability presented herein provide advantages over existing object discovery techniques. For example, various embodiments of the object discovery capability may eliminate problems resulting from use of multiple iterations of message exchanges in order to discover information in a wireless environment (e.g., triggering of back-off timers, increases in the number of iterations dependent on device density in the wireless environment, and the like). For example, various embodiments of the object discovery capability may eliminate problems associated with use of push techniques (e.g., lack of scalability with the number of devices and objects being shared, delays due to interference, and the like). For example, various embodiments of the object discovery capability may eliminate problems associated with use of push techniques (e.g., sensitivity to interference and collisions between offering devices, sensitivity to interference and collisions between requesting devices, and the like). Various other advantages of embodiments of the object discovery capability are contemplated.

Figure 4:
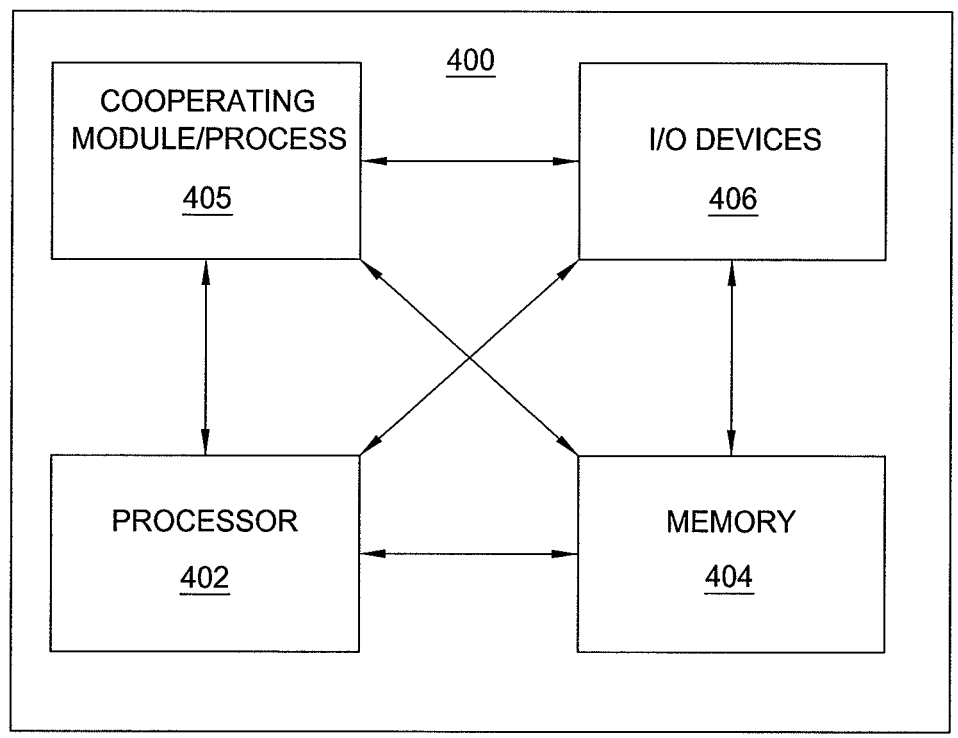
FIG. 4 depicts a high-level block diagram of a computer suitable for use in performing functions described herein.

FIG. 4 depicts a high-level block diagram of a computer suitable for use in performing functions described herein.

The computer 400 includes a processor 402 (e.g., a central processing unit (CPU) and/or other suitable processor(s)) and a memory 404 (e.g., random access memory (RAM), read only memory (ROM), and the like).

The computer 400 also may include a cooperating module/process 405. The cooperating process 405 can be loaded into memory 404 and executed by the processor 402 to implement functions as discussed herein and, thus, cooperating process 405 (including associated data structures) can be stored on a computer readable storage medium, e.g., RAM memory, magnetic or optical drive or diskette, and the like.

The computer 400 also may include one or more input/output devices 406 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 400 depicted in FIG. 4 provides a general architecture and functionality suitable for implementing functional elements described herein and/or portions of functional elements described herein. For example, the computer 400 provides a general architecture and functionality suitable for implementing one of the wireless nodes 110, a portion of one of the wireless nodes 110, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus for discovering objects available from a set of wireless nodes, the apparatus comprising:
   a processor and a memory communicatively connected to the processor, the processor configured to:
      receive a sequence of combined wireless signals, the combined wireless signals being respective wireless combinations of wireless signals of respective wireless signal sequences transmitted by the wireless nodes, the wireless signal sequences of the wireless nodes being representative of respective local object data structures of the wireless nodes, the local object data structures of the wireless nodes being indicative of respective sets of objects available from the wireless nodes; and
      generate a combined object data structure based on the sequence of combined wireless signals, the combined object data structure being indicative of objects available from the set of wireless nodes.

2. The apparatus of claim 1, wherein the wireless signal sequences transmitted by the wireless nodes correspond to respective sequences of values of the local object data structures of the wireless nodes, wherein the sequences of values of the local object data structures of the wireless nodes are indicative of the respective sets of objects available from the wireless nodes.

3. The apparatus of claim 2, wherein, to generate the combined object data structure, the processor is configured to:
   analyze one of the combined wireless signals to determine whether the one of the combined wireless signals is a global signal for FALSE that is used by each of the wireless nodes to represent FALSE values within the respective object data structures of the wireless nodes.

4. The apparatus of claim 3, wherein, to analyze one of the combined wireless signals to determine whether the one of the combined wireless signals is a global signal for FALSE, the processor is configured to:
   calculate a projection of the combined wireless signal on the global signal for FALSE.

5. The apparatus of claim 3, wherein, to generate the combined object data structure, the processor is configured to:
   based on a determination that the one of the combined wireless signals is a wireless combination of global signals for FALSE, set a corresponding value position of the combined object data structure to a value for FALSE.

6. The apparatus of claim 3, wherein, to generate the combined object data structure, the processor is configured to:
   based on a determination that the one of the combined wireless signals is not a wireless combination of global signals for FALSE, set a corresponding value position of the combined object data structure to a value for TRUE.

7. The apparatus of claim 1, wherein the processor is configured to:
   determine the sequence of combined wireless signals based on:

$$y[n] = \sum_{i=1}^{N} H_i x_i[n] + w[n],$$

wherein xi[n] is the n-th wireless signal of the wireless signal sequence transmitted by the i-th one of the wireless nodes, Hi is a complex number characterizing the wireless channel associated with the i-th one of the wireless nodes, and w[n] is an instance of random complex noise.

8. The apparatus of claim 1, wherein the processor is configured to:
   determine, based on the combined object data structure, whether a particular object is available from at least one of the wireless nodes in the set of wireless nodes.

9. The apparatus of claim 8, wherein, to determine whether a particular object is available from at least one of the wireless nodes in the set of wireless nodes, the processor is configured to:
   determine a set of value positions of the combined object data structure corresponding to the particular object; and
   determine whether the particular object is available from at least one of the wireless nodes in the set of wireless nodes based on a set of values from the set of value positions of the combined object data structure corresponding to the particular object.

10. The apparatus of claim 1, wherein the processor is configured to:
    identify, based on the sequence of combined wireless signals, one of the wireless nodes from which a particular object is available.

11. The apparatus of claim 10, wherein, to identify one of the wireless nodes from which a particular object is available, the processor is configured to:
    identify, from the sequence of combined wireless signals, one of the combined wireless signals corresponding to a value position of the combined object data structure which, when set to TRUE, indicates availability of the particular object; and
    determine one of the wireless signals of one of the wireless nodes which contributed to the identified one of the combined wireless signals.

12. The apparatus of claim 11, wherein, to determine one of the wireless signals of one of the wireless nodes which contributed to the identified one of the combined wireless signals, the processor is configured to:
    determine a set of signals, the set of signals including a global signal for FALSE that is used by each of the wireless nodes to represent FALSE values within respective local object data structures of the wireless nodes, the set of signals including respective signals for TRUE that are unique to the wireless nodes and used by the wireless nodes in order to represent TRUE values within the respective local object data structures of the wireless nodes; and
    determine the one of the wireless signals of one of the wireless nodes which contributed to the identified one of the combined wireless signals based on projection of the identified one of the combined wireless signals onto each signal in the set of signals S.

13. The apparatus of claim 12, wherein, to determine the set of signals, the processor is configured to:
    initialize the set of signals to include the global signal for FALSE;
    initialize a sequence of temporary signals r[n] having respective temporary signals equal to the combined wireless signals in the sequence of combined wireless signals:
    iterate as follows until respective values of the temporary signals r[n] are below a threshold:
       iterate as follows on each of the combined wireless signals:
          compute a value of the temporary signal r[n] by subtracting projections of the combined wireless signal y[n] on the set of signals S;
       determine, from among the temporary signals r[n], a wireless signal q having a lowest energy value that is greater than a threshold; and
       add the determined signal q to the set of signals S.

14. The apparatus of claim 12, wherein, to determine the one of the wireless signals of one of the wireless nodes which contributed to the identified one of the combined wireless signals based on projection of the identified one of the combined wireless signals onto each signal in the set of signals S, the processor is configured to:
    for each signal (s) in the set of signals;
       calculate a temporary signal r[n,s] by projecting the identified one of the combined wireless signals on the signal s from the set of signals; and
       determine whether the signal s contributed to the identified one of the combined wireless signals y[n] by measuring an energy value of the temporary signal r[n,s] and comparing the energy value of the temporary signal r[n,s] against a threshold.

15. The apparatus of claim 1, wherein the objects comprise at least one of node identifiers of the wireless nodes, information available from the wireless nodes, content items available from the wireless nodes, or services available from the wireless nodes.

16. The apparatus of claim 1, wherein the local object data structures are Bloom filters and the combined object data structure is a Bloom filter.

17. The apparatus of claim 1, wherein the processor is configured to:
    wirelessly transmit a request for objects message, the sequence of combined wireless signals being received responsive to processing of the request for objects message by the wireless nodes.

18. The apparatus of claim 1, wherein the memory is configured to store a local object data structure indicative of objects available from the apparatus, wherein the processor is configured to:
    represent the local object data structure as a sequence of signals by providing, for each value in a sequence of values of the local object data structure, a respective signal representing the value in the sequence of values, wherein each FALSE value in the sequence of values is represented using a global signal for FALSE that is used by each of the wireless nodes to represent FALSE values within the respective local object data structures of the wireless nodes, wherein each TRUE value in the sequence of values is represented using a local signal for TRUE that is unique to the wireless node for use by the wireless node to represent TRUE values of the respective local object data structure of the wireless node; and
    transmit the sequence of signals wirelessly.

19. The apparatus of claim 1, wherein the local object data structures of the respective wireless nodes comprise respective sets of values, wherein each FALSE value in each of the sets of values of the respective wireless nodes is represented using a global signal for FALSE that is used by each of the wireless nodes in the set of wireless nodes to represent FALSE values of the respective object data structures of the wireless nodes, wherein, for each of the wireless nodes in the set of wireless nodes, each TRUE value in the respective set of values of the respective wireless node is represented using a local signal for TRUE that is unique within the set of wireless nodes for use only by the respective wireless node to represent TRUE values of the object data structure of the respective wireless node.

20. The apparatus of claim 19, wherein, to generate the combined object data structure, the processor is configured to:
  determine whether one of the combined wireless signals is a global signal for FALSE; and
  set a value position of the combined object data structure, associated with the one of the combined wireless signals, to a value for FALSE based on a determination that the one of the combined wireless signals is a global signal for FALSE or to a value for TRUE based on a determination that the one of the combined wireless signals is not a global signal for FALSE.

21. A method for discovering objects available from a set of wireless nodes, the method comprising:
  using a processor and a memory for:
    receiving a sequence of combined wireless signals, the combined wireless signals being respective wireless combinations of wireless signals of respective wireless signal sequences transmitted by the wireless nodes, the wireless signal sequences of the wireless nodes being representative of respective local object data structures of the wireless nodes, the local object data structures of the wireless nodes being indicative of respective sets of objects available from the wireless nodes; and
    generating a combined object data structure based on the sequence of combined wireless signals, the combined object data structure being indicative of objects available from the set of wireless nodes.

22. A wireless node of a set of wireless nodes, the set of wireless nodes comprising the wireless node and at least one other wireless node, the wireless node comprising:
  a memory configured to store an object data structure indicative of objects available at the wireless node, the object data structure comprising a set of values; and
  a processor communicatively connected to the memory, the processor configured to:
    represent the object data structure as a sequence of signals by providing, for each value in the set of values, a respective signal representing the value in the set of values, wherein each FALSE value in the set of values is represented using a global signal for FALSE that is used by each of the wireless nodes in the set of wireless nodes to represent FALSE values within respective object data structures of the wireless nodes, wherein each TRUE value in the set of values is represented using a local signal for TRUE that is unique within the set of wireless nodes for use only by the wireless node to represent TRUE values of the object data structure of the wireless node; and
    control transmission of the sequence of signals from the wireless node wirelessly.

23. A method for use by a wireless node of a set of wireless nodes, the set of wireless nodes comprising the wireless node and at least one other wireless node, the method comprising:
  using a processor and a memory for:
    storing an object data structure indicative of objects available at the wireless node, the object data structure comprising a set of values;
    representing the object data structure as a sequence of signals by providing, for each value in the set of values, a respective signal representing the value in the set of values, wherein each FALSE value in the set of values is represented using a global signal for FALSE that is used by each of the wireless nodes in the set of wireless nodes to represent FALSE values within respective object data structures of the wireless nodes, wherein each TRUE value in the set of values is represented using a local signal for TRUE that is unique within the set of wireless nodes for use only by the wireless node to represent TRUE values of the object data structure of the wireless node; and
    controlling transmission of the sequence of signals from the wireless node wirelessly.

* * * * *